US012524403B2

(12) United States Patent
Barkan et al.

(10) Patent No.: US 12,524,403 B2
(45) Date of Patent: Jan. 13, 2026

(54) CONTEXT-BASED PROMPT GENERATION FOR AUTOMATED TRANSLATIONS BETWEEN NATURAL LANGUAGE AND QUERY LANGUAGE

(71) Applicant: Microsoft Technology Licensing, LLC, Redmond, WA (US)

(72) Inventors: Oren Barkan, Tel Aviv (IL); Yonathan Weill, Tel Aviv (IL); Noam Koenigstein, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 239 days.

(21) Appl. No.: 18/508,630

(22) Filed: Nov. 14, 2023

(65) Prior Publication Data
US 2025/0156413 A1    May 15, 2025

(51) Int. Cl.
*G06F 17/00*    (2019.01)
*G06F 16/2452*    (2019.01)
*G06F 40/295*    (2020.01)
*G06F 40/30*    (2020.01)

(52) U.S. Cl.
CPC ...... *G06F 16/24522* (2019.01); *G06F 40/295* (2020.01); *G06F 40/30* (2020.01)

(58) Field of Classification Search
None
See application file for complete search history.

(56) References Cited

U.S. PATENT DOCUMENTS

| 11,132,512 | B2* | 9/2021 | Wu | G06N 3/044 |
| 11,436,489 | B2* | 9/2022 | Coulombe | G06Q 30/0281 |
| 11,922,126 | B1* | 3/2024 | Zhang | G06F 40/30 |
| 12,153,892 | B1* | 11/2024 | Zhang | G06F 40/30 |

(Continued)

FOREIGN PATENT DOCUMENTS

| CN | 116701437 A | 9/2023 |
| JP | 2023076413 A | 6/2023 |

OTHER PUBLICATIONS

Machlis, Sharon, "How to use GPT as a natural language to SQL query engine", Retrieved from: https://www.infoworld.com/article/3700858/how-to-use-gpt-as-a-natural-language-to-sql-query-engine.html, Jul. 13, 2023, 5 Pages.

(Continued)

*Primary Examiner* — Satwant K Singh
(74) *Attorney, Agent, or Firm* — Holzer Patel Drennan

(57) ABSTRACT

A disclosed method facilitates translation of natural language queries into query language statements usable to retrieve data from or write data to a particular database. The method includes obtaining a pool of shots. Each shot in the pool includes a natural language query component and a corresponding database translation component. The method further provides for vectorizing the natural language query component for each of the shots into a common vector space; receiving a natural language query from a user interface; vectorizing the natural language query within the common vector space; identifying a subset of vectorized natural language query components that satisfy a similarity metric when compared to the vectorized natural language query; and generating an LLM prompt that includes shots from the pool corresponding to the subset of the vectorized natural language query.

20 Claims, 6 Drawing Sheets

(56) References Cited

U.S. PATENT DOCUMENTS

| | | | |
|---|---|---|---|
| 2023/0141398 A1 | 5/2023 | Bahdanau | |
| 2023/0153534 A1* | 5/2023 | Bansal | G06F 16/3329 704/9 |
| 2023/0177363 A1* | 6/2023 | Li | G06F 16/243 706/45 |
| 2023/0186025 A1* | 6/2023 | John | G06F 40/40 704/9 |
| 2023/0401213 A1* | 12/2023 | Shrivatsa Bhargav | G06F 16/9024 |
| 2024/0362286 A1* | 10/2024 | He | G06F 16/93 |
| 2024/0370479 A1* | 11/2024 | Hudetz | G06F 16/316 |

OTHER PUBLICATIONS

Rickman, et al., "Use natural language to execute SQL queries", Retrieved from: https://devblogs.microsoft.com/semantic-kernel/use-natural-language-to-execute-sql-queries/, Aug. 4, 2023, 5 Pages.

Rosenbaum, et al., "Using large language models (LLMs) to synthesize training data", Retrieved from: https://www.amazon.science/blog/using-large-language-models-llms-to-synthesize-training-data, Jan. 20, 2023, 12 Pages.

Sun, et al., "SQL-PALM: Improved large language model adaptation for text-to-SQL", In Repository of arXiv:2306.00739v3, Jun. 25, 2023, 16 Pages.

International Search Report and Written Opinion received for PCT Application No. PCT/US2024/052282, mailed on Feb. 5, 2025, 16 pages.

Lehmann, et al., "Language Models as Controlled Natural Language Semantic Parsers for Knowledge Graph Question Answering," 26th European Conference on Artificial Intelligence, Sep. 30-Oct. 4, 2023, Krakow, Poland—Including 12th Conference on Prestigious Applications of Intelligent Systems (PAIS 2023), Sep. 28, 2023, IOS Press, pp. 1-9.

* cited by examiner

CONTEXT-BASED PROMPT GENERATION FOR AUTOMATED TRANSLATIONS BETWEEN NATURAL LANGUAGE AND QUERY LANGUAGE

BACKGROUND

Conversational agents powered by large language models (LLMs) are often trained on datasets that include texts composed in query languages used to access databases. Consequently, some publicly-available LLMs already possess certain semantic fundamentals that could be leveraged to translate natural language queries into a database-readable query languages, such as Structured Query Language (SQL) statements. However, LLM accuracy is significantly limited when translating natural language to query language by factors such architectural variations between different databases, query complexity, and also by the many different ways natural language can be used to convey a question that has, typically, a single correct query language translation. Currently-proposed approaches that utilize LLMs to facilitate translations from natural language to query language are either highly unreliable or else cost-prohibitive in terms of manual configuration tasks (e.g., by a database administrator).

SUMMARY

According to one implementation, a method is disclosed for using a large language model (LLM) to translate a natural language query into a query language statement usable to retrieve data from or write data to a particular database. The method includes obtaining a pool of shots, where each shot in the pool includes a natural language query component and a corresponding database translation component that translates the natural language query component into a query language used by a particular database. The method further includes generating vectorized natural language query components by vectorizing the natural language query component for each of the shots into a common vector space; receiving, from a user interface, a natural language query requesting information stored in the particular database; vectorizing the natural language query to generate a request vector defined within the common vector space; identifying a subset of the vectorized natural language query components that satisfy a similarity metric when compared to the request vector; and generating an LLM prompt that includes shots from the pool corresponding to the subset of the vectorized natural language query components and a request to translate the natural language query into the query language used by the particular database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
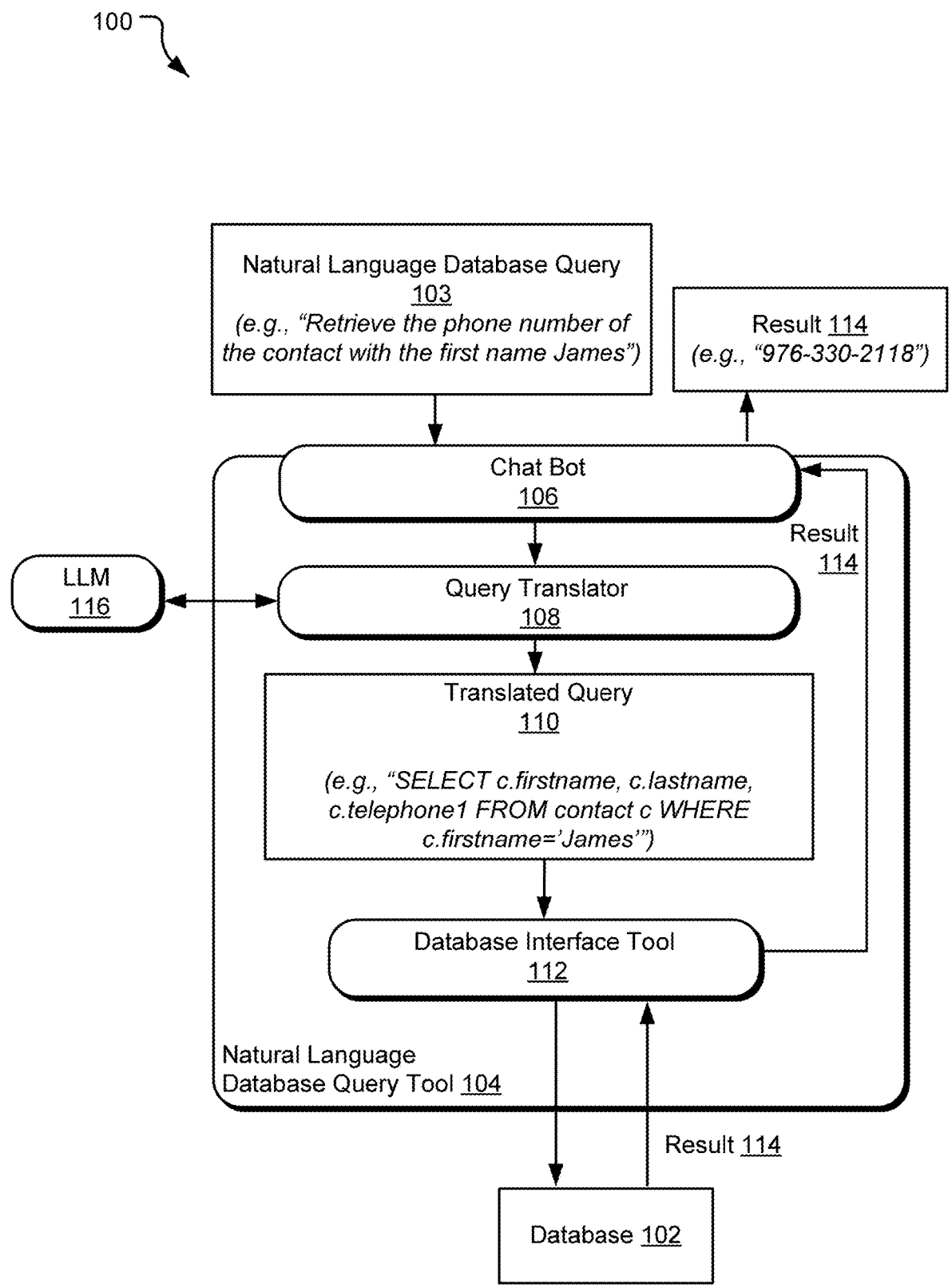
FIG. 1 illustrates an example system that facilitates natural language communications with a database using a natural language database query tool.

A query language, also known as data query language or database query language (DQL), is a computer language used to make queries in databases and information systems. Examples of popular query languages include Structured Query Language (SQL), XQuery, object query language (OQL), language integrated query (LINQ), and SQL/XML. Various publicly-available large language models (LLMs) have been trained on texts that include query language documents including, for example, well-known generative pre-trained transformer models GPT-3, GPT-3.5, and GPT-4, as well as a variety of other transformer-based models. Because these models have been trained on query language documents, they are capable of making some semantic inferences that are fundamental to translating natural language into query languages used for database access. However, unlike spoken languages with universally correct translations, the accuracy of a translation from natural language to query language depends heavily upon the architectural arrangement of elements unique to each individual database being accessed. LLMs cannot reliably generate correct query language statements (e.g., statements usable to retrieve data from or write data to a given database) without first being provided with at least some database-specific context, such as what type of data is stored and how the data is arranged and/or referenced.

One way to provide an LLM with request-specific context is to craft LLM prompts that include additional contextual information. For example, an LLM prompt requesting translation of a user query into a query language can be crafted to include a description of architectural elements within a particular database that the query pertains to, such as table identifiers and data field identifiers indexed within each table. However, even when provided with this type of architectural information, the LLM may still lack a sufficient semantic understanding of the identifiers associated with the various architectural elements and, as a result, be unable to correctly map those architectural elements to corresponding natural language descriptors. For example, the LLM may not have a basis for inferring that a natural language request for a "business address" corresponds to a data field named "BA" in a particular table.

The herein disclosed technology addresses the forgoing by providing, in each LLM prompt, a set of human-generated examples that are referred to herein as "shots" that mimic user chats and that demonstrate how the LLM should respond in different contexts. Each shot includes at least one natural language query component and a corresponding database translation component that translates the natural language query component into the query language used by a particular database. In some implementations, some or all shots included in the LLM prompt include actual or simulated portions of user chat sessions. For example, a single shot includes multiple questions that a user provides to a chat bot in natural language as well as the corresponding query language translations of those questions. In still other implementations, some or all shots included in the LLM prompt include database outputs produced in response to processing of a user query. For example, a shot includes a natural language question, a corresponding query language translation of the natural language question, and an output that is returned from a database in response to querying the database with the query language translation. In various implementations, the example shots included in the LLM prompt include a mix of the various above-described characteristics. Various benefits derived from use of shots with the respective above-described characteristics are explored throughout the following examples.

Notably, the shots included in a given LLM prompt are most helpful to the LLM when they provide context that is specific question being asked in that same prompt. Assume, for example, the user is asking "retrieve the phone number of the employee with the first name James," and the correct translation is "SELECT c.firstname, c.lastname, c.telephone1 FROM contact c WHERE c.firstname='James'." In this case, the LLM is more likely to output the correct translation when the request prompt includes shots illustrating how the exact terms included in the natural language query map to corresponding database elements of the database being queried (e.g., examples showing that the user's reference to "employee" is associated with the table named "contact," that the term "first name" maps to a column named "firstname," and that phone number maps to a column named "telephone1"). One way to ensure the inclusion of relevant shots is to include many shots (e.g., hundreds or thousands) in each LLM prompt. However, due to limits on permissible input prompt length imposed by most LLMs, it is not feasible to engineer LLM prompts that include hundreds of shots exemplifying a multitude of mappings.

Due to the above considerations, the challenge of creating an LLM prompt that includes a limited number of relevant shots is two-fold. The first challenge pertains to shot generation. It is non-trivial to generate a pool of shots that is both large enough and diverse enough to guarantee or nearly guarantee the existence of shots in the pool that are relevant to any possible user query. If, for example, a database administrator were asked to manually prepare a shot pool of this size and breadth, the requisite configuration time would be cost-prohibitive (e.g., taking many hours or even multiple full days). Even assuming that a shot pool of sufficient size and breadth could be created, another non-trivial challenge arises in relation to the automated selection of shots that are relevant (e.g., most likely to provide useful translation context) for a given user query. The herein disclosed technology provides solutions to both of the above-described challenges that can be implemented with minimal database administrator overhead, such as a total quantity of configuration time spanning a few minutes as compared to hours or days as per currently exiting approaches.

One implementation of the disclosed technology includes a translation tool that is, during initial configuration, provided with architectural context for understanding what tables, columns, and data items (e.g., rows) are stored in a particular database. During this initial configuration, a shot pool is generated. Each shot in the pool includes a natural language query component and a corresponding database translation component that translates the natural language query component into the query language used by the particular database. Each shot references the architectural elements of the particular database and could be executed by a database management system (DBMS) of the particular database to return the information requested by the natural language query component.

In one implementation, the translation tool also includes a chat bot that interfaces with a user and provides operations that utilize the shot pool and an LLM to translate user-provided natural language queries to structured database queries for the particular database. While the actual translation of each query is performed by an off-the-shelf LLM, the translation tool prepares each LLM prompt and includes, within each prompt, a subset of the shots in the pool that are automatically identified (without user input) as being the most semantically similar to the natural language query.

The automatic selection of relevant shots drastically reduces configuration overhead that is required (e.g., by a database admin or querying user) to facilitate database access as compared to other platforms that currently utilize AI to interface with database management systems. Since the proposed solution utilizes an off-the-shelf LLM, it can be implemented without any fine-tuning of model parameters and thereby at lower development cost (e.g., faster, while user fewer computational resources) than solutions that rely on specially-trained language models. The disclosed techniques and software tooling make it possible for a user with little to no understanding of a query language to communicate with a database in the query language.

Although the examples disclosed herein pertain primarily to retrieving information (reading) from a database, it is to be appreciated that the disclosed techniques can likewise be used to update (write to) a database.

FIG. 1 illustrates an example system 100 that facilitates natural language communications with a database 102 using a natural language database query tool 104. The natural language database query tool 104 includes various software components that perform translation and database access operations.

The various software components of the natural language database query tool 104 reside on a network that is configured for access to the database 102, which may be understood as including data storage hardware and a processor-executed database management system (DBMS) configured to read and write data to those storage locations in a particular query language. The database 102 may reside on a either a single machine or operate as a distributed database (e.g., on two or more interconnected servers on a computer network). Physical hardware components of the database may reside physically at an enterprise that owns the data stored in the database 102 or, instead, at cloud locations managed by a third-party entity, such as a data center managed by a software-as-a-service (SAAS) provider.

Like the database 102, various hardware and software components of the natural language database query tool 104 may be integrated within a single processing device or distributed across multiple networked computing devices. In one implementation, the natural language database query tool 104 is a SAAS-provided offering configurable on behalf of an particular entity to perform data access operations to a database that is managed by the entity.

The natural language database query tool 104 includes a chat bot 106 that provides a user interface (UI, not shown) for receiving user inputs, including a natural language database query 103. By example, FIG. 1 illustrates the natural language database query 103 as including the text "retrieve the phone number of the contact with the first name James." In one implementation, the user types this text into the UI of the chat bot 106. In another implementation, the user provides the natural language database query 103 by other means, such as by speaking into a microphone, in which case the chat bot 106 may additionally include or interface with an audio transcription tool that translates the spoken language to written text.

The chat bot 106 provides each natural language query that it receives from the UI to a query translator 108 that, in turn, prepares and transmits a translation request prompt to a large language model (LLM) 116 which, in turn, translates the natural language query into a query language used by the database 102. The prompt prepared by the query translator 108 includes contextual information (e.g., relevant shots and in some cases database architectural information) that the LLM 116 utilizes to make inferences about the natural language query that, in turn, increases accuracy of the resulting translation. Detailed example operations of the query translator 108 are discussed in detail with respect to FIG. 2-4 below.

For each natural language query input to the query translator 108, the query translator 108 outputs a corresponding translated query 110. In the example shown, the translated query 110 corresponding to the natural language database query 103 "retrieve the phone number of the contact with the first name James" is a query language (e.g., SQL) statement "SELECT c.firstname, c.lastname, c.telephone1 FROM contact c WHERE c.firstname='James.'"

The translated query 110 is provided as input to a database interface tool 112 (e.g., a software agent) that transmits the translated query 110 to the DBMS of the database 102. The DBMS of the database 102 executes the translated query 110 and returns a result 114 which is, in the illustrated example, a phone number for the contact with first name "James." The database interface tool 112 returns the result 114 to the UI of the chat bot 106, which displays the result 114 to the user.

In general, the LLM 116 can be understood as an off-the-shelf artificial neural network which can contain a billion to a trillion weights and that is trained using self-supervising learning and semi-supervised learning techniques. Examples of off-the-shelf LLMs include generative pre-trained transformer models (e.g., GPT-3, GPT-3.5, GPT-4) and transformer-based models such as PaLM 2 (Pathways Language Model, version 2), Claude v1, LLaMA (Large Language Model Meta AI), OPT (Open Pretrained Transformer), and Bloom language model (Bioscience Large Open-science Open-access Multilingual), etc.

Figure 2:
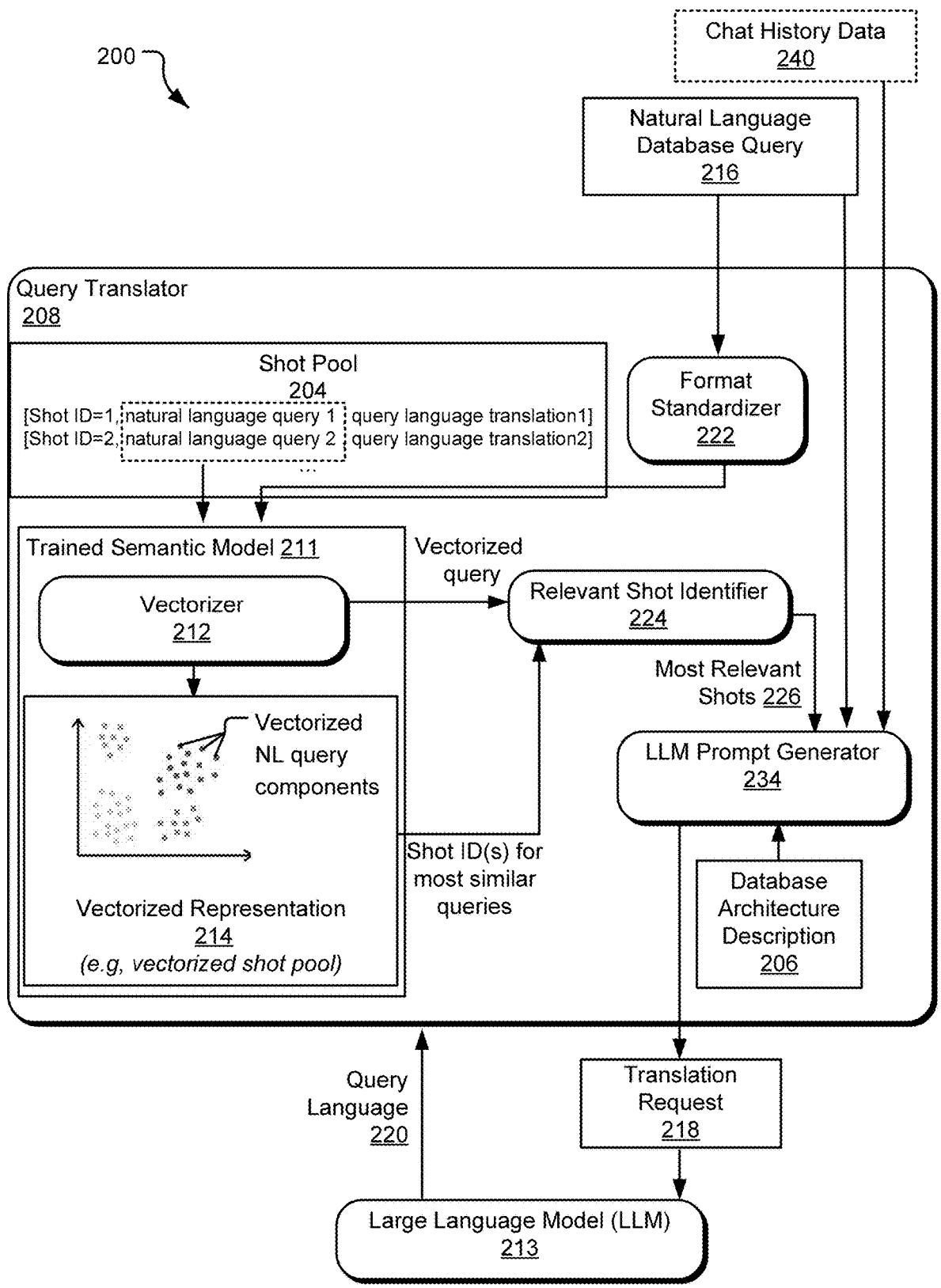
FIG. 2 illustrates an example translation system that performs actions for translating natural language database queries into corresponding query language counterparts usable to access a particular database.

FIG. 2 illustrates an example translation system 200 that performs actions for translating natural language database queries into corresponding query language counterparts usable to access a particular target database (referred as "the database" throughout the discussion of FIG. 2). The translation system 200 includes a query translator 208 and an LLM 213. In one implementation, the query translator 208 is included within the natural language database query tool 104 of FIG. 1 and performs functionality the same or similar to the functionality described above with respect to the query translator 108.

When initially configuring the query translator 208 for access to a particular database, a technical administrator (e.g., a database admin) performs various one-time configuration operations In one implementation, these one-time configuration operations include generating and supplying the query translator 208 with a database architectural description (e.g., database architecture description 206) that describes an architectural layout of the database, such as in natural language or other LLM-readable language. For example, the database architecture description 206 identifies tables stored in the database and identifiers used within the database to define the different data fields (e.g., columns) and data items (e.g., rows).

In one implementation, the database architecture description 206 is generated manually by a database administrator. In another implementation, the database architecture description 206 is automatically generated by an application that executes during an install process for the query translator 208. For example, the application probes the database to discover the architectural elements and outputs the database architecture description 206 with minimal or no input from a system administrator. The system admin may, during this install, supply inputs that identify the database as well as requisite access credentials for accessing the database. In at least some implementations, the system admin is not required to provide inputs that describe the contents of the database as part of the install and configuration of the query translator 208.

During the initial install and configuration of the query translator 208, the query translator 208 is also populated with a shot pool 204 including shots that exemplify correct translations between natural language and the query language used to access the database. Each shot includes a natural language query component as well as a corresponding translation of the natural language query component into the query language used by the database. In FIG. 2, each shot also is stored in association with a shot identifier (e.g., shot ID=1, shot ID=2) that is used to map each shot in the shot pool 204 to a corresponding vector generated by a trained semantic model 211 (discussed further below).

In one implementation, the shot pool 204 is populated entirely automatically. For example, the LLM 213 is provided with the database architecture description 206 and asked to self-generate example shots. In another implementation, the shot pool 204 is populated semi-automatically. For example, a technical administrator of the database provides a few example shots and the LLM 213 is asked to generate more example shots using the admin-provided shots and/or based on the database architecture description 206. In still another implementation, the shot pool 204 is populated manually, such as by shots that are all composed by database administrator. While there is no requirement that the shots be generated automatically or semi-automatically, these implementations significantly reduce configuration overhead as compared to those that employ purely manual shot generation. More details examples of automatic and semi-automatic shot generation for population of the shot pool 204 are discussed below with respect to FIG. 3.

A series of example shot shown below. In this example, each different shot includes a natural language query (NL) and corresponding query language translation (QL) of the natural language query.

```
< SHOT ID=1 {
  NL: Which user owns the opportunity 'ABCcorp Associates'?
  QL: SELECT o.owneridname, o.owninguser FROM opportunity o WHERE o.name
LIKE '%ABCcorp Associates%';
}>
<SHOT ID=2 {
  NL: What are the estimated values of all opportunities?
  QL: SELECT SUM(o.estimatedvalue) FROM opportunity o;
}>
<SHOT ID=3 {
  NL: Which team owns the opportunity 'Coca Cola'?
  WL: SELECT o.owneridname, o.owningteam FROM opportunity o WHERE o.name
LIKE '%Coca Cola%';
}>
<SHOT ID=4 {
  NL: Who is the owner of the contact associated with the account 'Streamwear Labs'?
  QL: SELECT c.owneridname, c.ownerid FROM contact c WHERE c.accountidname
= '%Streamwear Labs%'.
}>
```

In some implementations, some or all of shots in the shot pool 204 include multiple natural language queries and their corresponding query language translations. For example, the shot below (Shot ID=4) simulates a portion of a user chat session and includes a series of consecutively-asked natural language ("NL") questions as well as corresponding query language translations ("QL") of these questions and a corresponding database response to each questions ("DB_Response").

```
<SHOT ID = 4 {
  NL: Which user owns the opportunity 'ABCcorp Associates'?
  QL: SELECT o.owneridname, o.owninguser FROM opportunity o WHERE o.name LIKE
'%ABCcorp Associates%';
  DB_Response: Entity 1234
  NL: What is their email address?
  QL: SELECT o.emailaddress FROM contact c. WHERE c.owneridname="Entity1234."
  DB_Response: entity12342008@microsoft.com.
}>
```

In the above example (shot ID=4), the database response to the first question is the intended subject of the second question (e.g., "what is their email address"). Therefore, a shot structured as above could provide example context that helps an LLM interpret a similar series of natural language questions (e.g., with a first question requesting an entity identifier and a follow-up question requesting supplemental information about the entity). Although the above example shot does include a database response to each question asked, this is not a requirement. Some shots may include a series of a natural language questions, corresponding translations and not include DB responses.

In one implementation, each of the generated shots is input to and processed by a format standardizer 222 prior to being stored in the shot pool 204. The format standardizer 222 is, in one implementation, a language model trained to reformat the query 216 according to Named Entity Recognition (NER) standards by replacing various specifically-named entities with corresponding entity type identifiers defined by the NER standards. For example, the format standardizer 222 identifies nouns that correspond to one of multiple predefined entity labels such as "person," "date," "event," "numeric," "event", etc. (all of which are entity type identifiers) and replaces those nouns with the corresponding entity label. This formatting step ensures reduced sensitivity to specific numbers, person names, etc. For example, the original natural language query, "show the names and phone numbers of accounts with more than 500 employees and revenue over $1 million," is reformatted by the format standardizer 222 as: "show the names and phone numbers of accounts with more than <NUMERIC> employees and revenue over <NUMERIC>." This standardization allows the resulting user query to more easily be compared to assess semantic similarity to shots in the shot pool 204.

In a simple example of a shot that includes a single natural language query referencing a single specific entity, the format standardizer 222 replaces instances of the specific entity with a same entity type identifier. If, for example, that natural language query is "Which user owns the opportunity Coca-Cola" and the corresponding query language translation is "SELECT o.owneridname, o.owninguser FROM opportunity o WHERE o.name LIKE 'Coca-cola,'" the format re-standardizer merely replaces both instances of the specific entity "Coca-Cola" with an entity type identifier <AccountName>.

However, in one implementation where the format standardizer 222 is provided with the above-referenced multi-question (e.g., "Shot ID=4"), the format standardizer 222 outputs the following with entity type tags replacing each of multiple specific entities:

```
<Shot ID=4 {
  NL: Which user owns the opportunity <AccountName>?
  QL: SELECT o.owneridname, o.owninguser FROM opportunity o WHERE o.name LIKE
'<AccountName>';
  DB_Response: < UserName>
```

```
NL: What is their email address?
QL: SELECT o.emailaddress FROM contact c. WHERE c.owneridname=<UserName>.
DB_Response: <Email Address>
}>
```

Notably, the entity type identifiers in this reformatted shot (e.g., <AccountName>, <UserName>, and <EmailAddress>) provide semantic context similar to their corresponding specific entity names that can help an LLM map conversational elements to their corresponding query language identifiers. Assume, for example, the query 216 asks: "what is his email address"? If this question were provided to the LLM 213 in a vacuum, it is unlikely that the LLM 213 would generate a corresponding query language translation that accurately captures the intended question. If, however, the LLM 213 is provided with a prompt that includes (1) the query 216; (2) chat history data 240 including recent natural language user inputs and database response outputs generated during a same chat session as the query 216, and (3) the reformatted shot above (e.g., provided to help exemplify the requested translation), the LLM 213 can then use the chat history information to infer the intended subject of the query 216 (e.g., "what is his email address") and to also infer a mapping of the intended subject (the entity referenced by "his") to its corresponding query language identifier in LLM-generated query language translation of the query 216.

Once fully populated, the shot pool 204 may include hundreds or even thousands of shots. Following population of the shot pool 204, a trained semantic model 211 is used to generate a vectorized representation 214 of the natural language components of the various shots in the shot pool 204. Specifically, the trained semantic model 211 includes a vectorizer 212 that transforms all or a portion of the information included in the shot in the shot pool 204 into a vector in a high-dimensional vector space, also referred to herein as a "vectorized shot."

Each vectorized shot embeds the natural language component(s) included in the corresponding shot from the shot pool 204 and, in some implementations, other aspects of the shot as well. In, for example, the shot includes multiple queries and database responses (e.g., as in the example above where Shot ID=4), the corresponding vectorized shot main embed the natural language queries and the corresponding database responses.

Within the high-dimensional vector space of the trained semantic model 211, vector-to-vector separations correlate with a learned degree of semantic similarity between corresponding pairs of the natural language query components of shots residing in the shot pool 204.

In one implementation, the trained semantic model 211 is a trained natural language processing (NLP) model that translates textual strings into vectors in higher-dimensional space (e.g., tens or hundreds of dimensions) with mathematical distances between pairs of vectors correlating with a learned degree of semantic similarity of the corresponding strings. Examples of NLP models of this type include sequence-to-sequence (Seq2Seq) models or transformer models, such as BERT (Bidirectional Encoder Representations from Transformers). Notably, some transformer language models encode each string as a single high dimensional vector (e.g., a Word embedding), while others may embed different terms as different high dimensional vectors that can be combined, concatenated, or used in the alternative (depending on the application), to facilitate computation of a similarity metric usable to assess similarity between two strings. For example, some versions of BERT used embeddings of a classification token (the CLS token) as the representation for classification tasks. Examples of similarity metrics suitable for assessing semantic similarity of the vectorized natural language components within the vectorized representation 214 include dot product and cosine similarity computations. For example, a cosine similarity of 1 indicates identical vectors and the semantic similarity is therefore understood as increasing as the cosine similarity of the corresponding vectors increases between zero and one.

Once the above-described initial configuration operations are completed (e.g., the database architecture description 206 is obtained, the shot pool 204 is populated and each of the shots is vectorized by the trained semantic model 211, the query translator 208 is fully configured and ready to perform translation tasks for accessing the database on behalf of an end user (e.g., a user who may be different than the technical administrator that initiated the install and configuration process for the query translator 208).

During real-time user operations, the query translator 208 performs translation operations that, in FIG. 2, are illustrated with respect to a single translation task. Specifically, the query translator 208 receives as input a natural language database query, referred to herein as "query 216."

In the illustrated implementation, the query translator 208 initially provides the query 216 to the format standardizer 222, which identifies specific entity names and replaces those entity names with standardized entity type identifiers, as generally described above. The reformatted natural language query output by the format standardizer 222 is input to the vectorizer 212 that, in turn, vectorizes the reformatted natural language query as described above with respect to each shot in the shot pool 204. The resulting vectorized user query is defined within the vector space of the trained semantic model 211 such that similarity between the query 216 and the natural language component(s) embedded in of any individual one of the represented shots can be assessed by measuring Euclidean distance between the corresponding vectors defined within the vectorized representation 214. Notably, the semantically similar of vectors is also described herein in terms of relevance, with relevance scaling increasingly higher in proportion to semantic similarity.

The vectorized translation of the query 216 (the "vectorized user query") is then input to a relevant shot identifier 224 that assesses a similarity metric, such as a dot product or cosine similarity, that is computed between the vectorized user query and each of the vectorized natural language query components represented within the vectorized representation 214. Based on this assessment, the relevant shot identifier 224 identifies a subset of the vectorized natural language query components that are most semantically similar to the vectorized user query (the "most relevant vectors"). Shots within the shot pool 204 that correspond to the most relevant vectors are then identified and output by the relevant shot identifier 224. For example, the relevant shot identifier 224 identifies the most semantically similar vectorized natural language query components (e.g., "most similar vectors") and uses a shot ID stored in association with each of these vectorized natural language query components to map the component back to its corresponding shot in the shot pool 204 (e.g., per the "Shot ID" field shown in the shot pool 204). These corresponding shots output by the relevant shot identifier 224 are collectively referred to herein as "most relevant shots 226"-meaning, the shots that are most likely to provide context that the LLM 213 can leverage to increase accuracy of the requested translation.

In various implementations, the relevant shot identifier 224 executes different logic to select a subset of the "most relevant"-meaning, "most semantically similar"-vectorized queries and their corresponding shots from the shot pool 204. For example, the relevant shot identifier 224 computes the similarity metric between the vectorized user query and each of the vectorized shots defined within the vectorized representation 214 of the trained semantic model 211. The relevant shot identifier 224 then identifies, as the most relevant vectors, the subset of the vectorized shots for which the computed similarity metric exceeds a predefined threshold. Alternatively, the most relevant vectors include a predefined number of the vectorized shots identified as being most semantically similar to the request vector. The relevant maps the most relevant vectors back to their corresponding shots in the shot pool (e.g., using a shot ID stored in association with each vector and each shot), and outputs these corresponding shots as the "most relevant shots 226."

The most relevant shots 226 are input to an LLM prompt generator 234 along with the database architecture description 206 and the query 216 (e.g., in its original form as supplied by the user). Based on these inputs, the LLM prompt generator 234 generates the translation request 218, which is an LLM prompt requesting the LLM 213 to translate the query 216 into the query language use by the database. The translation request 218 includes the most relevant shots 226 (e.g., the shots as identified as pertaining to natural language queries most semantically similarity to the query 216) and also includes some or all of the database architecture description 206. In one implementation, the query translator 208 includes an application that uses the most relevant shots 226 to identify relevant portion(s) of the database architecture description 206 to include in the translation request 218. In other implementations, the translation request 218 includes all of the database architecture description 206.

In some implementations (such as the system described below with respect to FIG. 4), the translation request 218 also includes chat history data 240 that includes a series of user-provided inputs and outputs returned by a chat bot during a same chat session as that that through which the user query 216 is received by the query translator 208. In general, inclusion of chat history information in the translation request 218 is most useful when one or more of the most relevant shots 226 included in the translation request 218 includes a series of consecutive/related queries, such as in the multi-query example shot discussed above with respect with respect to the shot identifier "Shot ID=4.

The LLM 213 processes the translation request 218 and returns a query language translation 220 that is in the language used by the database. In some implementations (e.g., that include further system components shown in FIG. 1), the query translator 208 provides the query language translation to a database interface tool that, in turn, queries the database to retrieve (and to return to the user) the information requested by the query 216.

Figure 3:
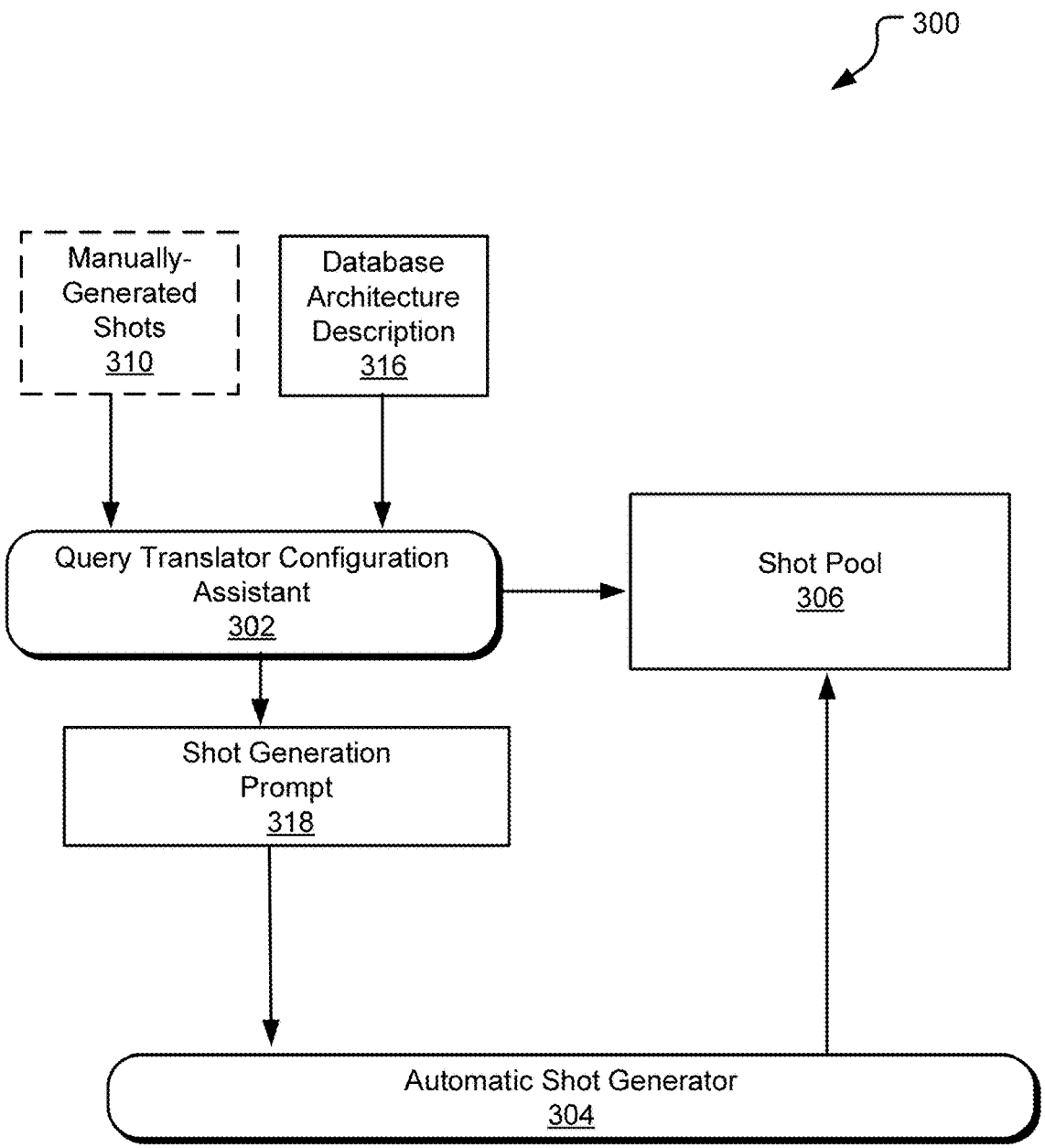
FIG. 3 illustrates aspects of another example system that performs actions for translating natural language database queries into corresponding query language counterparts usable to query a particular database.

FIG. 3 illustrates aspects of another example system 300 that performs actions for translating natural language database queries into corresponding query language counterparts usable to query a particular database. The system 300 includes a query translator configuration assistant 302 and an automatic shot generator 304 that work in concert to populate a shot pool 306 with hundreds or thousands of shots (natural language/query language translation examples) that each include the same or similar to components to those described above with respect to FIG. 2. In one implementation, the query translator configuration assistant 302 is a software component of the query translator 208 shown in FIG. 2. The query translator configuration assistant 302 is, for example, executed during initial configuration of the query translator 208 and/or at select times when it is desirable to update the shot pool 306, such as in response to architectural changes within the particular database. For example, shot generation is initiated when a technical administrator selects an interface option (e.g., of the query translator 208 of FIG. 2) to update the shot pool 306 or in response to auto-detection of changes within the particular database.

As input, the query translator configuration assistant 320 receives a database architecture description 316 that describes an architectural layout of the particular database, such as in natural language or other LLM-readable language or format. In one implementation, the architectural layout includes table identifiers used to reference tables stored in the database, column identifiers used to references columns of each table, and a query language identifier that identifies the query language utilized by the particular database.

In one implementation where the shot pool 306 is populated entirely automatically, the query translator configuration assistant generates a shot generation prompt 318 that instructs the automatic shot generator 304 to generate shots based on the database architecture description 316. For example, the shot generation prompt is of a format such as: "1. {Database Context}, 2. Generate examples of natural language queries and corresponding query language translations of those queries using {Database Context}," where {Database Context} includes the database architecture description 316. The query translator configuration assistant 302 provides the shot generation prompt 318 to the automatic shot generator 304 which, in turn, executes the instruction included in the prompt. The automatic shot generator 304 is a trained natural language model that has a semantic understanding of the query language used by the particular database. In one implementation, the automatic shot generator 304 is the same LLM that is ultimately used by the disclosed systems to translate user-provided natural language queries into a query language (e.g., the LLM 213 in FIG. 2). In other implementations, the automatic shot generator 304 is another trained natural language model different from the LLM that performs the translation of user queries in the fully-configured version of the system 300.

In this implementation where the shot pool 306 is populated in an entirely automatic manner (e.g., without a technical administrator providing any example shots), the generated shots are a result of natural language inferences that the automatic shot generator 304 is able to make with respect to the identifiers of architectural elements included in the database architecture description 316 and the types of data most likely stored in association with each identifier. Appreciably, this method of shot generation is most accurate when the architectural elements in the particular database have identifiers that are descriptive of the types of entities (e.g., data) represented by each of the elements. If, for example, the database includes contact information and data fields descriptive of types of contact information (e.g., "phone number", "mailing address", "email address", the automatic shot generator 304 is more likely to be able to generate correct shots than in a database storing the same information with less descriptive data fields (e.g., a data field "A" storing street address, "P" storing phone number, "E" storing email address). This is due to the fact that the automatic shot generator 304 has, through its own training corpus, and understanding of the types of data semantically similar to each of the descriptive data fields included in the database architecture description 316.

In an implementation where the shot pool 306 is populated in a semi-automatic manner, a technical administrator provides a limited selection of manually-generated shots 310 as input to the query translator configuration assistant 302. Upon receipt of these manually-generated shots 310, the query translator configuration assistant 302 generates the shot generation prompt 318 which, in this case, asks the automatic shot generator 304 to generate more shots based on the database architecture description 316 using the manually-generated shots 310 as examples. For example, the shot generation prompt 318 is of a format such as: "1. {Database Context}, 2. {Shot Examples} 3. Use the {Database Context} to generate examples of natural language queries and corresponding query language translations similar to {Shot Examples}," where {Database Context} includes the text of the database architecture description and {Shot Examples} includes the manually-generated shots 310. In one example implementation where the shot pool 306 is populated in a semi-automatic manner consistent with the above, a technical administrator provides a few (e.g., 5-10) example shots and the automatic shot generator generates hundreds or thousands more. In different implementations, the manually-provided shots have different forms and characteristics. For example, a shot may include a single natural language question and its corresponding query language translation or multiple (e.g., related or consecutively-asked) natural language questions and their corresponding query language translations. In some cases, the manually-provided and/or automatically-generated shots also include database responses to the query language questions included in the shot.

Appreciably, the inclusion of the manually-generated shots 310 provides the automatic shot generator 304 with context useful for mapping certain natural language descriptors to corresponding database elements (e.g., tables, columns) defined within the database architecture description 316. If, for example, the database architecture description 316 defines a column identifier "A" (which stores addresses), a manually-generated shot referencing the descriptor "address" (e.g., in the natural language component) and corresponding identifier "A" (e.g., in the query language translation of the natural language component), this can help the automatic shot generator 304 infer the meaning of "A" and thereby ensure better accuracy of the automatically-generated shots than in the above-described implementation where the shot pool 306 is generated completely automatically.

Figure 4:
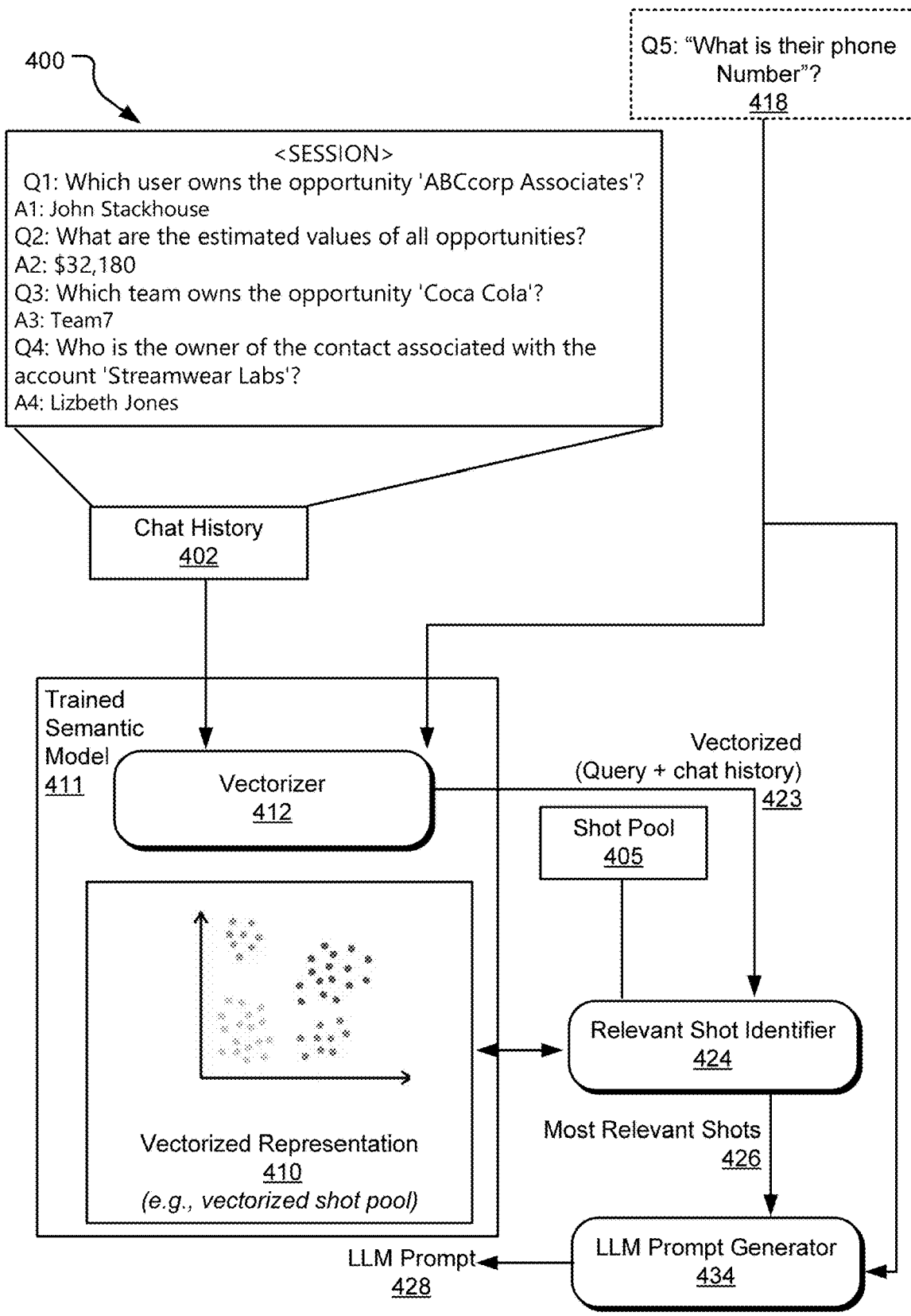
FIG. 4 illustrates example components of another system that translates natural language database queries into query language statements usable to query a particular database.

FIG. 4 illustrates example components of another system 400 that uses a trained large language model (LLM) to facilitate natural language communications with a database management system designed to interpret and executed queries formatted in a particular a query language. In one implementation, components of the system 400 are part of a query translator that functions as described with respect to any of FIG. 1-3. The particular combination of components illustrated in the system 400 perform functions that assist in the automated selection of relevant shots to include in an LLM prompt requesting translation of a user query from natural language to query language.

The implementation of FIG. 4 differs from the previously-described system in that it utilizes contextual information pertaining to a user's chat history when selecting the relevant shots to include in the LLM prompt. When conducting a conversation with a chat bot (such as the chat bot 106 shown in FIG. 4) a user may, at times, utilize pronouns and various informalities that cannot be properly understood without reference to earlier conversational exchanges during the same session. By example, FIG. 4 illustrates chat history 402 including series of queries that a user has typed into a chat interface during an active user session and the answers output by the chat bot in response. In this example, it is assumed that the chat interface is provided as part of a natural language database query tool (e.g., the natural language database query tool 104 of FIG. 1) that is configured to translate each received natural language query to a query language query, execute the query on a target database, and return the output to the user through the chat interface. In the chat history 404, prior user queries are shown as Q1-Q4 with corresponding answers A1-A4, respectively, ordered with recency increasing from bottom to top (e.g., top being the oldest question). Here, the last question asked was "who is the owner of the contact associated with the account 'Streamwear Labs'? Following the processing of this question (Q4) receiving a corresponding response (e.g., "A4: Lizbeth Jones"), the same user then provides a user query 418 (Q5), "What is their phone number"? In this case, the "their" refers back to the answer received in response to the previous question (Q4).

Without knowledge of the chat history 402, a trained LLM is unlikely to be able to provide a query language translation of "what is their phone number" that is usable to retrieve the requested phone number from the database. To remedy this shortcoming, the system 400 includes a shot pool 405 with individual shots that simulate portions of user chat session. For example, each shot includes multiple natural related (e.g., consecutively-asked) natural language questions, corresponding query language translations, and (optionally) database responses to those questions. Additionally, to ensure selection of the most relevant shots pertaining to the user query 418, the system 400 embeds aspects of the chat history 402 in a vector that is used to select the relevant shots. This process is described below.

In the system 400, a trained semantic model 411 is used to generate a vectorized representation 410 of natural language queries included within a shot pool (e.g., in a manner generally consistent with that described with population of the shot pool 204 shown in FIG. 2). The trained semantic model 411 includes a vectorizer 412 that transforms the natural language component(s) of each of the shots into a vector in a high-dimensional vector space in which vector-to-vector separations correlate with a learned degree of semantic similarity of the corresponding natural language query components of each shot.

In some implementations, the user query 418 is subjected to processing before being provided to the vectorizer 412. For example, the user query 418 is first provided to and reformatted by a trained format-standardizing language model that performs actions the same or similar to the format standardizer discussed above with respect to FIG. 2. At the time that the user query 418 is provided as input to the vectorizer 412, the vectorizer 412 also incorporates the chat history 402 or some portion thereof (e.g., the past few questions asked and their corresponding answers) into a vectorized representation of the user query 418 that is shown in FIG. 4 as "vectorized (query+chat history) 423", referred to in the discussion below "the vectorized user query 423." The vectorized user query 423 is then provided as input to a relevant shot identifier 424 that computes a similar metric between the vectorized user query 423 and each of the vectorized queries represented within the vectorized representation 410 generated by the trained semantic model 411. Based on this assessment, the relevant shot identifier 424 identifies a subset of the vectorized queries ("the most relevant vectors") that are identified as being the most semantically similar to the vectorized user query 423. Pre-generated shots corresponding to each of these identified most relevant vectors are then identified from the shot pool and output by the relevant shot identifier 424 as the "most relevant shots 426."

Due to the fact that the vectorized user query 423 incorporates aspects of the chat history 402 and the fact that shots in the shot pool 405 simulate portions of user chat sessions, the most relevant shots 426 are likely to include natural language queries that ask similar questions about the same entity types and/or that mirror structure of the chat history 402 leading up to the query 418. For example, the most relevant shots 424 may include one shot with natural language components of the form:

NL: Which user owns the contact associated with <AccountName>
DB Response: <UserName>
NL: What is their phone number?

Notably, these questions structurally mirror the last question in the chat history 402 followed by the query 418. Consequently, an LLM could, if provided with the chat history 402 and the example shot above, use the example to map the specific entities in the chat history 402 to the appropriate entity type identifiers within query language components of the example, thereby generating a query language translation of the query 216 that accurately captures the user's intent.

The most relevant shots 426 output by the relevant shot identifier 424 are input to an LLM prompt generator 434 along with the user query 418 and, in some implementations, an architectural description (not shown in FIG. 4) of a target database. Based on these inputs, the LLM prompt generator generates an LLM prompt 428 that instructs an LLM (not shown) to translate the user query 418 into a particular query language use by the target database. Consistent with other implementations described herein, the LLM prompt 428 includes the most relevant shots 426, the user query 418, and some or all of the database architecture description (not shown). Other aspects of the system 400 not specifically described with respect to FIG. 4 are assumed to be the same or similar as those described with respect to like-named components of other implementations described herein.

Figure 5:
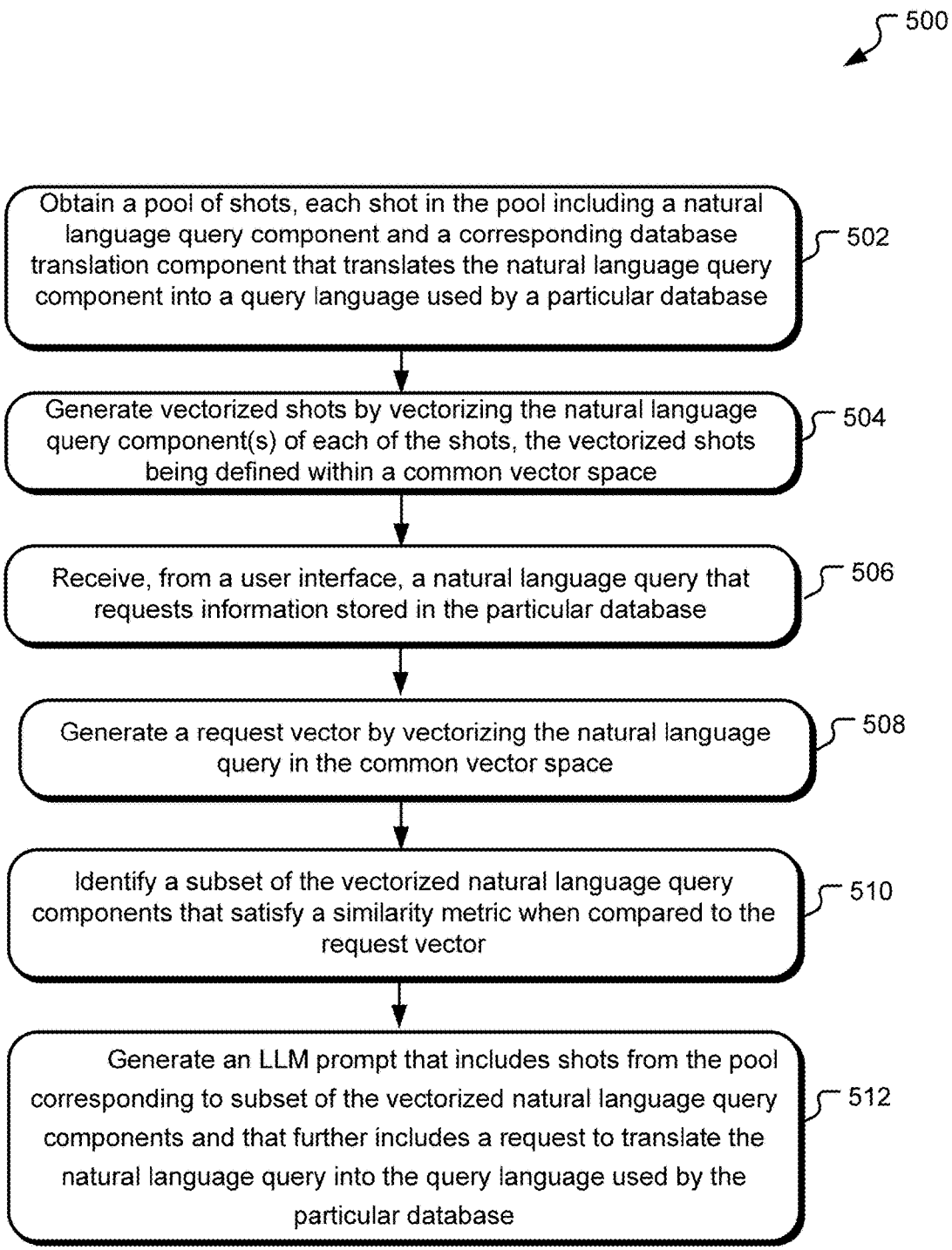
FIG. 5 illustrates example operations for translating natural language database queries into corresponding query language counterparts usable to query a particular database.

FIG. 5 illustrates example operations 500 for translating natural language database queries into corresponding query language counterparts usable to query a particular database. A configuration operation 502 obtains a pool of shots to be selectively included in LLM prompts requesting translation of natural language queries to query language statements usable to retrieve information from or write information to a particular database. Each shot in the pool includes at least one natural language query component and a corresponding database translation component that translates the natural language query component into a query language statement that can be processed by a database management system of the particular database. In some implementations, shots in the pool mimic a portion of a user chat session by including multiple natural language query components (e.g., consecutively-asked questions) and a corresponding database translation component for each of the natural language query components. In still other implementations, the shots further include database responses returned when the database is queried with the query-language questions (e.g., the database translation components) included in the shot.

A first vectorization operation 504 employs a trained semantic model to vectorize the natural language query component(s) within each one of the shots, thereby generating vectorized shots. In one implementation, the vectorized shots are defined within a common vector space of the trained semantic model in which vector-to-vector separations correlate with a learned degree of semantic similarity between corresponding pairs of the shots.

A receiving operation 506 receives, from a user interface, a natural language query requesting information stored in the particular database. In one implementation, the natural language query is received from a chat bot that manages a chat session with a user, such as through a web browser window.

A second vectorization operation 508 uses the trained semantic model to vectorize the natural language query, thereby generating a request vector defined within the common vector space of the trained semantic model.

An identification operation 510 identifies a subset of the vectorized natural language query components (e.g., the components created by the first vectorization operation 504) that satisfy a similarity metric when compared to the request vector. For example the identification operation 510 includes computing the similarity metric (e.g., a dot product or cosine similarity) between the request vector and each of the vectorized natural language query components and selecting the subset of the vectorized natural language query component for which the corresponding similarity metric satisfies predefined criteria, such as by exceeding a predefined threshold or by ranking among a top predefined number of the vectorized natural language query components in terms of similarity to the query vector.

An LLM prompt generation operation 512 generates an LLM prompt that includes shots from the shot pool corresponding to the subset of the vectorized natural language query components satisfying the similarity metric. The LLM prompt further includes a request to translate the natural language query into the query language used by the particular database.

In other implementations not represented by FIG. 5, the operations 500 further include providing the LLM prompt to an LLM and receiving LLM output in response. In some implementations, the LLM output (e.g., a query language translation of the natural language query) is returned to the user interface, such as to permit the user to self-initiate a database query by copying and pasting the LLM output into a prompt associated with the particular database. In other implementations, the operations 500 further provide for automatically executing a query to the particular database using the output of the LLM and returning a database response to the query back to the user interface.

Figure 6:
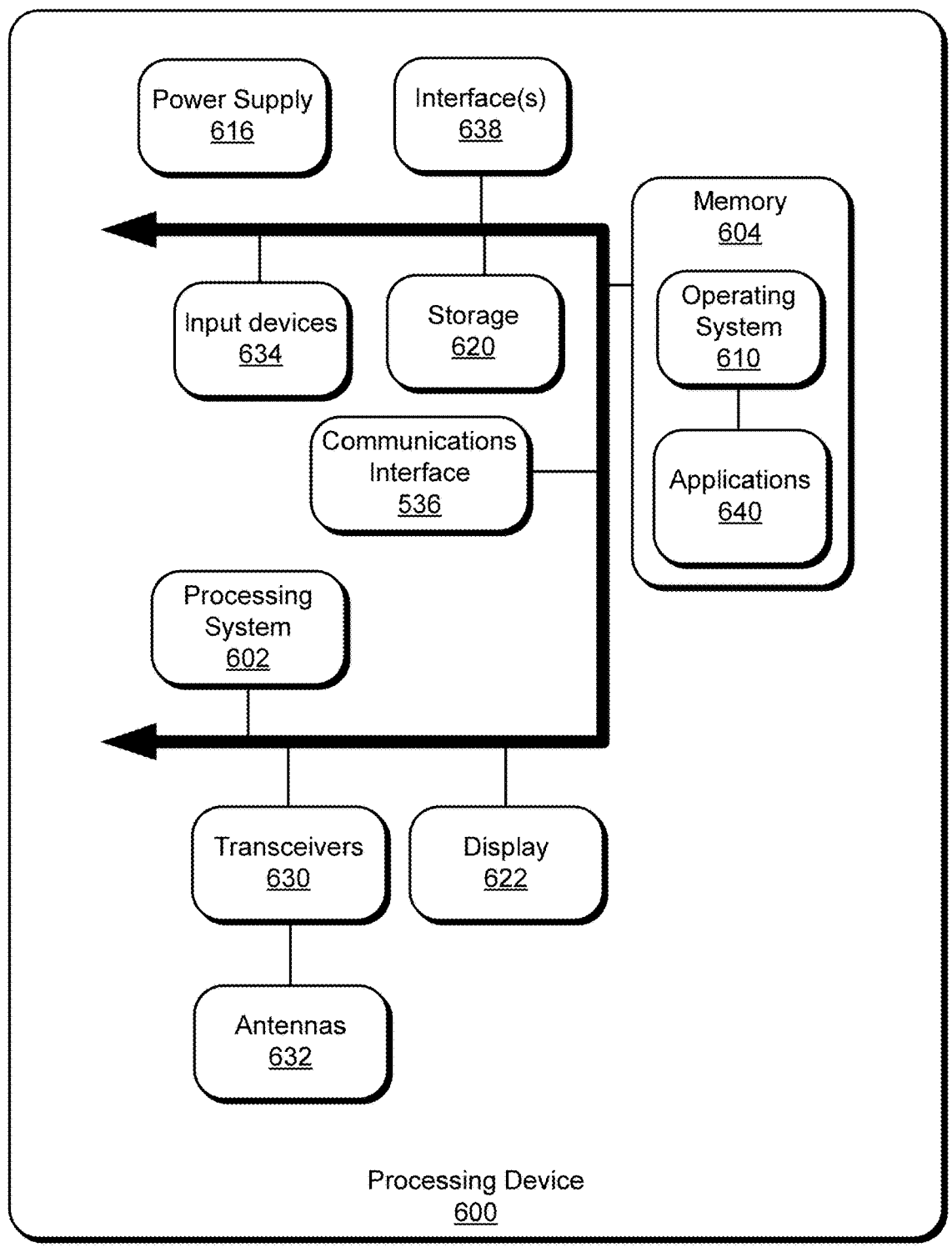
FIG. 6 illustrate an example schematic of a processing device suitable for implementing aspects of the disclosed technology.

FIG. 6 illustrates an example schematic of a processing device 600 suitable for implementing aspects of the disclosed technology. The processing device 600 includes a processing system 602, memory 604, a display 622, and various input and/or output interfaces 638 (e.g., buttons). The processor unit(s) 602 may each include one or more central processing units (CPUs), graphics processing units (GPUs), etc. The memory 604 generally includes both volatile memory (e.g., random access memory (RAM)) and non-volatile memory (e.g., flash memory). An operating system 610, such as the Microsoft Windows® operating system or other operating system resides in the memory 604 and is executed by the processing system 602.

One or more applications 640 (e.g., that chat bot 106, the query translators 108 or 208 or any of their respective subcomponents, the automatic shot generator 304, the query translator configuration assistant 302, the database interface tool 112) are loaded in the memory 604 and executed on the operating system 610 by the processing system 602. In some implementations, aspects of a query translator (e.g., the query translator 108 of FIG. 1 or the query translator 208 of FIG. 2) are loaded into memory of different processing devices connected across a network. The applications 640 may receive inputs from one another as well as from various input local devices 634 such as a microphone, input accessory (e.g., keypad, mouse, stylus, touchpad, gamepad, racing wheel, joystick), and a camera.

Additionally, the applications 640 may receive input from one or more remote devices, such as remotely-located servers or smart devices, by communicating with such devices over a wired or wireless network using more communication transceivers 630 and an antenna 632 to provide network connectivity (e.g., a mobile phone network, Wi-Fi®, Bluetooth®). The processing device 600 also includes storage (e.g., non-volatile storage) for storing chat history data (e.g., within chat history 402 of FIG. 4), a database (e.g., the database 102 of FIG. 1), contextual data describing aspects of the database (e.g., the database architecture description 206 of FIG. 2), and more.

The processing device 600 further includes a power supply 616, which is powered by one or more batteries or other power sources and which provides power to other components of the processing device 600. The power supply 616 may also be connected to an external power source (not shown) that overrides or recharges the built-in batteries or other power sources. Additionally, the processing device 600 includes a communications interface 636 for communicating with other processing devices across a network, such as a local area network (LAN) and/or a wide area network (WAN) (e.g., the internet).

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

In some aspects, the techniques described herein relate to a method including: obtaining a pool of shots that each include a natural language query component and a corresponding database translation component that translates the natural language query component into a query language used by a particular database; generating vectorized shots by vectorizing, with a trained semantic model, information within each of the shots, the vectorized shots being defined within a common vector space in which vector-to-vector separations correlate with a learned degree of semantic similarity between corresponding pairs of natural language query components; receiving, from a user interface, a portion of a chat session including a natural language query requesting information stored in the particular database; vectorizing, by the trained semantic model, the portion of the chat session to generate a request vector defined within the common vector space; identifying a similar subset of the vectorized shots that satisfy a similarity metric when compared to the request vector; and generating an LLM prompt that includes a group of the shots from the pool corresponding to the similar subset of the vectorized shots and a request to translate the natural language query into the query language used by the particular database.

In some aspects, the techniques described herein relate to a method, wherein the method further includes: providing the LLM prompt as input to an LLM; and receiving, from the LLM, a translation of the natural language query in the query language used by the particular database; querying the particular database with the translation of the natural language query; and returning a response from the particular database to the user interface.

In some aspects, the techniques described herein relate to a method, wherein obtaining the pool of shots further includes: providing an input prompt to an LLM that includes: a database architecture description for the particular database; and a request for the LLM to generate multiple shots based on the database architecture description, each of the shots including the natural language query component and the corresponding database translation component; and storing the multiple shots output by the LLM within the pool of shots.

In some aspects, the techniques described herein relate to a method, wherein obtaining the pool of shots further includes: receiving one or more manually-generated shots, wherein the request for the LLM to generate the multiple shots is further based on the one or more manually-generated shots.

In some aspects, the techniques described herein relate to a method, wherein vectorizing the portion of the chat session further includes: providing the natural language query to a format standardizing LLM, the format standardizing LLM being trained to re-format the natural language query according to Named Entity Recognition (NER) standards; and providing an output of the format standardizing LLM as input to the trained semantic model.

In some aspects, the techniques described herein relate to a method, wherein vectorizing the portion of the chat session to generate the request vector further includes: obtaining chat history data stored in association with a chat session, the chat history data including one or more prior natural language queries provided through the user interface in association with the particular database, wherein the request vector embeds both the natural language query and the chat history data.

In some aspects, the techniques described herein relate to a method, wherein identifying the similar subset of the vectorized shots that satisfy the similarity metric when compared to the request vector further includes: computing a cosine similarity or dot product between the request vector and multiple of the vectorized shots, the similar subset of the vectorized shots including either: a selection of the vectorized shots for which a computed cosine similarity or dot product exceeds a predefined threshold; or a predefined number of the vectorized shots identified as most similar to the request vector.

In some aspects, the techniques described herein relate to a system including: a pool of shots, each shot in the pool including a natural language query component and a corresponding database translation component that translates the natural language query component into a query language used by a particular database; a trained semantic similarity model that generates vectorized shots by vectorizing information within each of the shots into a common vector space; a query translator stored in memory and executable to: receive, from a user interface, a natural language query requesting information stored in the particular database; generate a request vector by vectorizing the natural language query into the common vector space; identify a similar subset of the vectorized shots that satisfy a similarity metric when compared to the request vector; generate an LLM prompt that includes: a group of the shots from the pool corresponding to the similar subset of the vectorized natural shots; and a request to translate the natural language query into the query language used by the particular database; provide the LLM prompt as input to an LLM; and receive, from the LLM, a translation of the natural language query into the query language used by the particular database.

In some aspects, the techniques described herein relate to a system, further including: a database interface tool stored in memory and executable to: query the particular database with the translation of the natural language query; and return a response from the particular database to the user interface.

In some aspects, the techniques described herein relate to a system, wherein the system further includes: an automatic shot generator stored and memory and executable to: provide an input prompt to the LLM that includes: database architecture description for the particular database; and a request for the LLM to generate multiple shots based on the database architecture description, each of the shots including the natural language query component and the corresponding database translation component.

In some aspects, the techniques described herein relate to a system, wherein the request for the LLM to generate the multiple shots is further based on one or more manually-generated shots.

In some aspects, the techniques described herein relate to a system wherein the query translator is further executable to: provide the natural language query to a format standardizing LLM, the format standardizing LLM being trained to re-format the natural language query according to Named Entity Recognition (NER) standards, wherein the request vector is generated from an output of the format standardizing LLM.

In some aspects, the techniques described herein relate to a system, wherein the query translator is further executable to: obtain chat history data stored in association with a current chat session, the chat history data including one or more prior natural language queries provided through the user interface in association with the particular database, wherein the request vector embeds both the natural language query and the chat history data.

In some aspects, the techniques described herein relate to a system, wherein the query translator is further executable to: compute a cosine similarity or dot product between the request vector and multiple of the vectorized shots, the similar subset of the vectorized shots including either: a selection of the vectorized shots for which a computed cosine similarity or dot product exceeds a predefined threshold; or a predefined number of the vectorized shots identified as most similar to the request vector.

In some aspects, the techniques described herein relate to one or more tangible computer-readable storage media encoding processor-executable instructions for executing a computer process including: obtaining a pool of shots that each include a natural language query component and a corresponding database translation component that translates the natural language query component into a query language used by a particular database; generating vectorized shots by vectorizing, with a trained semantic model, information within each of the shots within a common vector space; receiving, from a user interface, a natural language query requesting information stored within the particular database; vectorizing, by the trained semantic model, the natural language query to generate a request vector defined within the common vector space; identifying a similar subset of the vectorized shots that satisfy a similarity metric when compared to the request vector; generating an LLM prompt that includes: a group of the shots from the pool corresponding to the similar subset of the vectorized shots; and a request to translate the natural language query into the query language used by the particular database; providing the LLM prompt as input to an LLM;

and receiving, from the LLM, a translation of the natural language query in the query language used by the particular database.

In some aspects, the techniques described herein relate to one or more tangible computer-readable storage media, wherein the computer process further includes: querying the particular database with the translation of the natural language query; and returning a response from the particular database to the user interface.

In some aspects, the techniques described herein relate to one or more tangible computer-readable storage media, wherein obtaining the pool of shots further includes: providing an input prompt to the LLM that includes: a database architecture description for the particular database; and a request for the LLM to generate multiple shots based on the database architecture description, each of the shots including the natural language query component and the corresponding database translation component.

In some aspects, the techniques described herein relate to one or more tangible computer-readable storage media, wherein obtaining the pool of shots further includes: receiving one or more manually-generated shots, wherein the request for the LLM to generate the multiple shots is further based on the one or more manually-generated shots.

In some aspects, the techniques described herein relate to one or more tangible computer-readable storage media, wherein vectorizing the natural language query to generate the request vector further includes: obtaining chat history data stored in association with a chat session, the chat history data including one or more prior natural language queries provided through the user interface in association with the particular database; and embedding the chat history data and the natural language query in the request vector.

In some aspects, the techniques described herein relate to one or more tangible computer-readable storage media, wherein identifying the similar subset of the vectorized shots that satisfy the similarity metric when compared to the request vector further includes: computing a cosine similarity or dot product between the request vector and multiple of the vectorized shots.

In some aspects, the techniques described herein relate to a system including: a means for obtaining a pool of shots that each include a natural language query component and a corresponding database translation component that translates the natural language query component into a query language used by a particular database; a means for generating vectorized shots by vectorizing information within each of the shots, the vectorized shots being defined within a common vector space in which vector-to-vector separations correlate with a learned degree of semantic similarity between corresponding pairs of natural language query components; a means for receiving, from a user interface, a portion of a chat session including a natural language query requesting information stored in the particular database; a means for vectorizing the portion of the chat session to generate a request vector defined within the common vector space; identifying a similar subset of the vectorized shots that satisfy a similarity metric when compared to the request vector; and a means for generating an LLM prompt that includes a group of the shots from the pool corresponding to the similar subset of the vectorized shots and a request to translate the natural language query into the query language used by the particular database.

The logical operations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
   obtaining a pool of shots that each include a natural language query component and a corresponding database translation component that translates the natural language query component into a query language used by a particular database;
   generating vectorized shots by vectorizing, with a trained semantic model, information within each of the shots, the vectorized shots being defined within a common vector space in which vector-to-vector separations correlate with a learned degree of semantic similarity between corresponding pairs of natural language query components;
   receiving, from a user interface, a portion of a chat session including a natural language query requesting information stored in the particular database;
   vectorizing, by the trained semantic model, the portion of the chat session to generate a request vector defined within the common vector space;
   identifying a similar subset of the vectorized shots that satisfy a similarity metric when compared to the request vector; and
   generating a large language model (LLM) prompt that includes:
      a group of the shots from the pool corresponding to the similar subset of the vectorized shots; and
      a request to translate the natural language query into the query language used by the particular database.

2. The method of claim 1, wherein the method further comprises:
   providing the LLM prompt as input to an LLM; and
   receiving, from the LLM, a translation of the natural language query in the query language used by the particular database;
   querying the particular database with the translation of the natural language query; and
   returning a response from the particular database to the user interface.

3. The method of claim 1, wherein obtaining the pool of shots further includes:
   providing an input prompt to an LLM that includes:
      a database architecture description for the particular database; and
      a request for the LLM to generate multiple shots based on the database architecture description, each of the shots including the natural language query component and the corresponding database translation component; and
   storing the multiple shots output by the LLM within the pool of shots.

4. The method of claim 3, wherein obtaining the pool of shots further includes:
receiving one or more manually-generated shots, wherein the request for the LLM to generate the multiple shots is further based on the one or more manually-generated shots.

5. The method of claim 1, wherein vectorizing the portion of the chat session further includes:
providing the natural language query to a format standardizing LLM, the format standardizing LLM being trained to re-format the natural language query according to Named Entity Recognition (NER) standards; and
providing an output of the format standardizing LLM as input to the trained semantic model.

6. The method of claim 1, wherein vectorizing the portion of the chat session to generate the request vector further includes:
obtaining chat history data stored in association with a chat session, the chat history data including one or more prior natural language queries provided through the user interface in association with the particular database, wherein the request vector embeds both the natural language query and the chat history data.

7. The method of claim 1, wherein identifying the similar subset of the vectorized shots that satisfy the similarity metric when compared to the request vector further comprises:
computing a cosine similarity or dot product between the request vector and multiple of the vectorized shots, the similar subset of the vectorized shots including either:
a selection of the vectorized shots for which a computed cosine similarity or dot product exceeds a predefined threshold; or
a predefined number of the vectorized shots identified as most similar to the request vector.

8. A system comprising:
memory;
a pool of shots stored in the memory, each shot in the pool including a natural language query component and a corresponding database translation component that translates the natural language query component into a query language used by a particular database;
a trained semantic similarity model stored in the memory and executable by a processing system to that generates generate vectorized shots by vectorizing information within each of the shots into a common vector space;
a query translator stored in the memory and executable by the processing system to:
receive, from a user interface, a natural language query requesting information stored in the particular database;
generate a request vector by vectorizing the natural language query into the common vector space;
identify a similar subset of the vectorized shots that satisfy a similarity metric when compared to the request vector;
generate a large language model (LLM) prompt that includes:
a group of the shots from the pool corresponding to the similar subset of the vectorized natural shots; and
a request to translate the natural language query into the query language used by the particular database;
provide the LLM prompt as input to an LLM; and
receive, from the LLM, a translation of the natural language query into the query language used by the particular database.

9. The system of claim 8, further comprising:
a database interface tool stored in memory and executable to:
query the particular database with the translation of the natural language query; and
return a response from the particular database to the user interface.

10. The system of claim 8, wherein the system further comprises:
an automatic shot generator stored and memory and executable to:
provide an input prompt to the LLM that includes:
database architecture description for the particular database; and
a request for the LLM to generate multiple shots based on the database architecture description, each of the shots including the natural language query component and the corresponding database translation component.

11. The system of claim 10, wherein the request for the LLM to generate the multiple shots is further based on one or more manually-generated shots.

12. The system of claim 8 wherein the query translator is further executable to:
provide the natural language query to a format standardizing LLM, the format standardizing LLM being trained to re-format the natural language query according to Named Entity Recognition (NER) standards, wherein the request vector is generated from an output of the format standardizing LLM.

13. The system of claim 8, wherein the query translator is further executable to:
obtain chat history data stored in association with a current chat session, the chat history data including one or more prior natural language queries provided through the user interface in association with the particular database, wherein the request vector embeds both the natural language query and the chat history data.

14. The system of claim 8, wherein the query translator is further executable to:
compute a cosine similarity or dot product between the request vector and multiple of the vectorized shots, the similar subset of the vectorized shots including either:
a selection of the vectorized shots for which a computed cosine similarity or dot product exceeds a predefined threshold; or
a predefined number of the vectorized shots identified as most similar to the request vector.

15. One or more tangible computer-readable storage media encoding processor-executable instructions for executing a computer process comprising:
obtaining a pool of shots that each include a natural language query component and a corresponding database translation component that translates the natural language query component into a query language used by a particular database;
generating vectorized shots by vectorizing, with a trained semantic model, information within each of the shots within a common vector space;
receiving, from a user interface, a natural language query requesting information stored within the particular database;
vectorizing, by the trained semantic model, the natural language query to generate a request vector defined within the common vector space;

identifying a similar subset of the vectorized shots that satisfy a similarity metric when compared to the request vector;
generating a large language model (LLM) prompt that includes:
a group of the shots from the pool corresponding to the similar subset of the vectorized shots; and
a request to translate the natural language query into the query language used by the particular database;
providing the LLM prompt as input to an LLM; and
receiving, from the LLM, a translation of the natural language query in the query language used by the particular database.

16. The one or more tangible computer-readable storage media of claim 15,
wherein the computer process further comprises:
querying the particular database with the translation of the natural language query; and
returning a response from the particular database to the user interface.

17. The one or more tangible computer-readable storage media of claim 15, wherein obtaining the pool of shots further includes:
providing an input prompt to the LLM that includes:
a database architecture description for the particular database; and
a request for the LLM to generate multiple shots based on the database architecture description, each of the shots including the natural language query component and the corresponding database translation component.

18. The one or more tangible computer-readable storage media of claim 17, wherein obtaining the pool of shots further includes:
receiving one or more manually-generated shots, wherein the request for the LLM to generate the multiple shots is further based on the one or more manually-generated shots.

19. The one or more tangible computer-readable storage media of claim 15, wherein vectorizing the natural language query to generate the request vector further includes:
obtaining chat history data stored in association with a chat session, the chat history data including one or more prior natural language queries provided through the user interface in association with the particular database; and
embedding the chat history data and the natural language query in the request vector.

20. The one or more tangible computer-readable storage media of claim 15, wherein identifying the similar subset of the vectorized shots that satisfy the similarity metric when compared to the request vector further comprises:
computing a cosine similarity or dot product between the request vector and multiple of the vectorized shots.

* * * * *